United States Patent Office
3,681,284
Patented Aug. 1, 1972

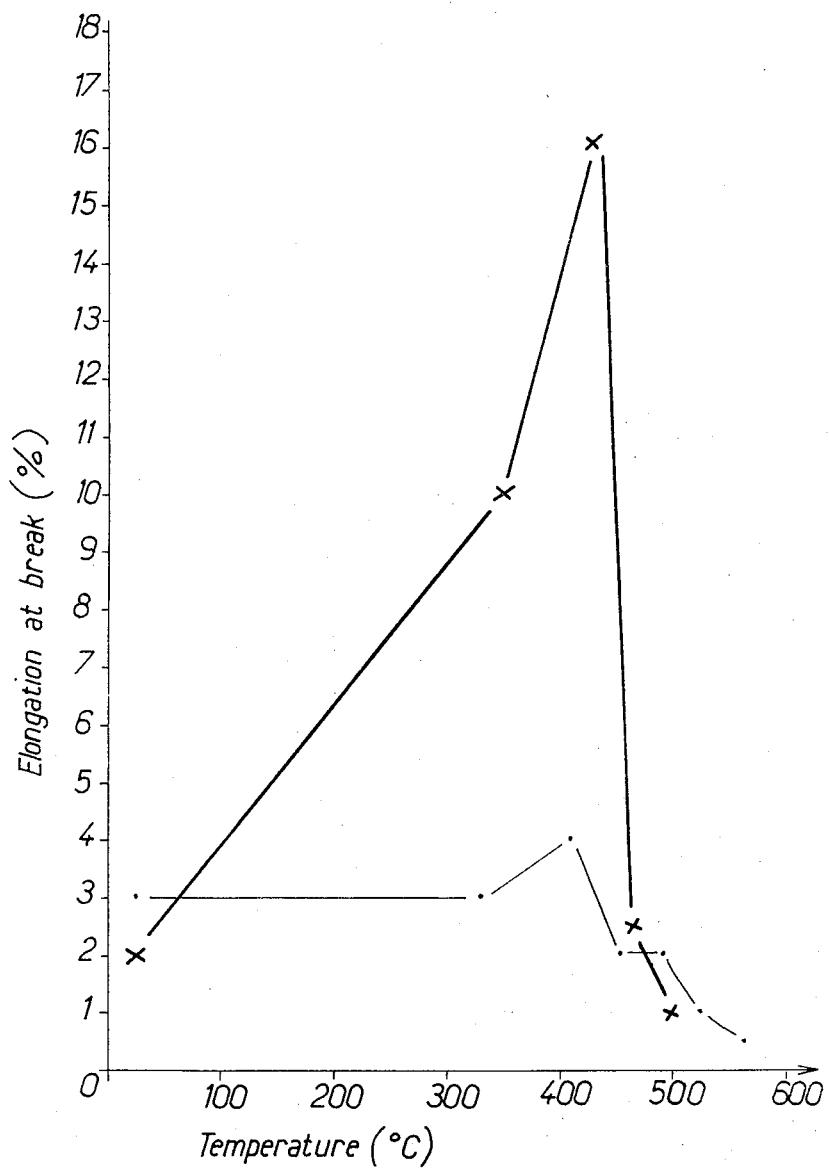

3,681,284
AROMATIC-HETEROCYCLIC POLYMERS, PREPOLYMERS THEREOF AND PROCESS FOR PREPARATION THEREOF
Friedrich Grundschober, Onex, and John Harry Arendt, Cologny, Geneva, Switzerland, assignors to Centre National d'Etudes Spatiales, Paris, France
Filed Nov. 30, 1970, Ser. No. 93,748
Claims priority, application France, Dec. 1, 1969, 6941392
Int. Cl. C08g 20/32
U.S. Cl. 260—47 CP     5 Claims

ABSTRACT OF THE DISCLOSURE

An aromatic-heterocyclic, thermally stable, ladder type polymer which contains, in its high molecular weight main chain, a link having dibenzodioxine as one of its constituents. The invention also relates to a process of preparing said polymer and a prepolymer formed during said process.

---

This invention to aromatic-heterocyclic polymers having a "ladder" structure, prepolymers thereof and to processes for preparation thereof.

Those skilled in the art will already be familiar with a large number of aromatic heterocyclic polymers which exhibit a remarkable degree of thermal stability. These polymers, when exhibiting useful mechanical properties such as good tensile strength and flexibility, have been found to contain in their molecular structure aromatic and heterocyclic rings joined by simple bonds. These bonds constitute weak points in the macromolecular structure, especially as far as thermal stability is concerned. Moreover, and again due to the simple bonds, the mechanical properties of this kind of polymer are affected by temperature. It has in fact been found that the modulus of elasticity reduces and the elongation to rupture increases, with increase of temperature, if these properties are measured at temperatures in excess of 400° C. This behaviour constitutes a serious drawback for applications in which dimensional stability at these temperatures is of major importance. In fact, if it is desired to produce an article of a polymer having high thermal stability, the mechanical properties of which article are to change very little with increase in temperature, then a polymer having a "ladder" structure must be chosen.

The idea of creating a "complete" ladder structure is known per se. However, it is difficult to produce this kind of structure in practice because of the difficulty of developing the reaction due to the steric size.

In the majority of cases, the polymers obtained in practice have relatively short ladder segments and also contain reactive groups which have been unable to react, including simple bonds. It goes without saying that polymers of this kind do not have the required properties, as far as the thermal stability and dimensional stability at elevated temperatures, are concerned.

In other cases, ladder-structure polymers with a more or less fully developed ladder structure have been produced, but these polymers do not exhibit any worthwhile mechanical properties because of their excessive rigidity.

The prime object of the invention is to produce a novel thermally stable ladder polymer which exhibits both good tensile strength and excellent dimensional stability when used for example, in thin film form.

Accordingly, the invention provides an aromatic-heterocyclic ladder polymer which is characterised by the fact that it contains, in the high molecular weight main chain, a link having dibenzodioxine as one of its constituents.

The invention also provides a prepolymer of this thermally stable polymer, which prepolymer can readily be subjected to a moulding operation before conversion to a final polymer, without appreciable deterioration of the latter.

The invention relates, furthermore, to a particularly simple process for preparing said thermally stable polymer and its prepolymer.

The polymers of the invention correspond with one or the other of the structural formulae set out below:

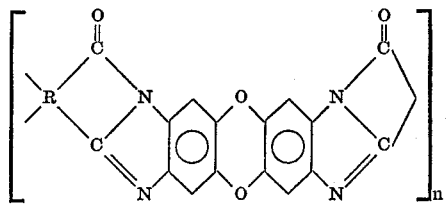

and

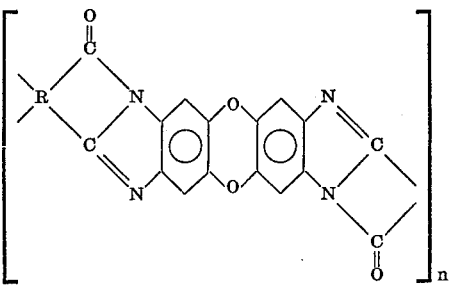

where $n$ is a sufficiently high whole number to enable good mechanical properties to be achieved, R is a tetravalent radical containing at least two carbon atoms and linked to the carbon atoms in pairs, the carbon atoms of each pair being in the 1, 2 or 1,3 position on the carbon atoms or the R-group when R is aliphatic, and at the ortho or peri positions when R is aromatic.

The polymer in accordance with the invention is characterised by the presence of repeated patterns comprising condensed nuclei containing dibenzodioxine nuclei and nuclei of a bicyclic system chosen from either 5-ketopyrrolo (1,2-a) imidazole:

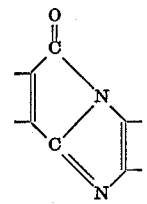

and 6-keto-pyrido (1,2-a) imidazole:

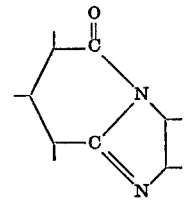

The exceptional mechanical properties of the novel polymer forming the subject of this invention are demonstrated by the graph in the single figure of the attached drawings, which graph shows the variation in elongation, with temperature, for a known polymer containing the diphenyl ether link:

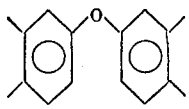

and for a novel polymer containing the hetrocyclic dibenzo-p-diozine link:

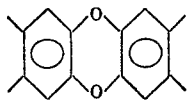

the other links being identical.

The elongation of the latter product is virtually constant throughout a very wide range of temperatures. This means, in practice, that thin films of the novel polymer can be used at temperatures of as much as 500° C. without experiencing any appreciable deformation. In fact, films of this kind remain perfectly smooth and do not shrink after heating to 500° C. in nitrogen for a period of half an hour.

The firmly stable polymers in accordance with the invention are prepared by a process which consists of carrying out a reaction, in substantially and preferably strictly equimolar ratios, between tetra-amino-benzinedioxine and a tetra-carboxylic acid dianhydride of the formula:

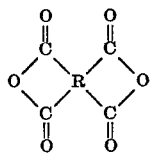

where R is a tetravalent organic radical containing at least two carbon atoms connected to the four carbonyl groups in pairs, the carbonyl groups of each pair being at the 1,2 or 1,3 position on the carbon atoms of the radical R when R is aliphatic, and that the ortho or peri positions when R is aromatic, so that the cyclic dioxide can be formed in an organic solvent at a temperature advantageously less than —10° C.

The prepolymer thus obtained can be cast or extruded to form a film, a filament, a tube or some other product; it can alternatively be used in solution as a coating product or the like.

The articles obtained from this prepolymer are then dried and their general properties improved by "cyclizing" the prepolymer by heat treatment at a temperature of at least 150° C. and possibly more. A drawing operation in at least one direction, at a temperature of at least 150° C. will, in the case of certain articles (in particular films), likewise improve their mechanical properties in the corresponding direction(s). The dried drawn articles have content of volatile material of between 0 to 95% of their weight.

The polymers produced by the invention have numerous applications. We can refer, for example, to the substrates of thin-film solar cells and printed circuits, other films, tubes, fibres, etc., etc. The articles can be given their shape by virtue of the solubility of the prepolymer and then have required properties imparted thereto by the thermal cycling operation.

Instead of being constituted by the ladder type aromatic heterocyclic polymer alone, these articles may be made of a mixture of this polymer modified by additives, in combination or likewise, with other polymers. The additives can, in particular, be metal particles, pigments, dielectric materials, lubricants and so on. These additives can be added prior to or after the shaping of the article. The metal particles can be added superficially to the undried prepolymer, the drying, cycling and drawing of the film being carried out later as required.

The production of a foam or cellular product can be achieved using this polymer by incorporating a foaming agent in the prepolymer and by carrying out subsequent heating in order to decompose the foaming agent and cycled the polymer.

The prepolymer can also be applied as a coating to a substrate. The prepolymer constituting the coating may or may not be added with additive products. This kind of coating can be applied to various kinds of substrates, for example metals, mineral products, foamed products, fabrics, other polymers.

The cyclized aromatic-heterocyclic ladder polymers can be used as constituents of laminates with one or more of the substrates referred to hereinbefore.

The raw materials required for the production of the products in accordance with the present invention are, on the one hand 2,3,7,8-tetra-amino-dibenzo-p-dioxine and, on the other hand, at least one tetra-carboxylic acid dianhydride.

By way of the dianhydrides which can be used, we can list the following as examples:

pyomellitic dianhydride,
2,3,6,7-naphthalene tetracarboxylic dianhydride,
1,2,5,6-naphthalene tetracarboxylic dianhydride,
3,4,9,10-perylene tetracarboxylic dianhydride,
ethylene-tetracarboxylic dianhydride,
naphthalene 1,2,4,5-tetracarboxylic dianhydride,
naphthalene 1,4,5,8-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenantrene-1,8,9,10-tetracarboxylic dianhydride,
cyclopentene-1,2,3,6-tetracarboxylic dianhydride,
pyrrolidine-2,3,4,5-tetracarboxylic dianhydride,
pyrazine-2,3,5,6-tetracarboxylic dianhydride,
benzene-1,2,3,4-tetracarboxylic dianhydride,
thiopene-2,3,4,5,-tetracarboxylic dianhydride.

Advantageously, polymerisation will be carried out in an appropriate solvent medium. The organic solvent should be inert for the system and preferably constitute a solvent for the product, but it should also dissolve at least one of the reagent and preferably both. The normally liquid organic solvents of the N,N-dialkyl carboxyl amide class can be used as solvents for the purposes of the processes of the invention. The preferred solvents are low-molecular weight compositions of this class, in particular N,N-dimethyl formamide and N,N-dimethyl acetamide. These solvents can readily be driven off from the prepolymer, and/or the moulded articles produced from said prepolymer, by evaporation, displacement or diffusion. We can list as other typical solvents of this class, the following:

N,N-dimethyl formamide, N,N-diethyl acetamide, N,N-dimethyl methoxy acetamides, N-methylcaprolactam, etc. Other solvents which can be used in the context of the present invention are as follows: dimethyl sulfoxide, N-methyl-2-pyrrolidone tetramethylene urea, pyridine, dimethylsulfone, hexamethyl phosphoramide, polyphosphoric acid, tetramethylene sulfone, formamide, N-methyl formamide and N-acetyl-2-pyrrolidone. These solvents can be used on their own, in a mixture with one another, or in a mixture with less suitable solvents such as benzene, benzonitrile, dioxane, butyrolactone, xylene, toluene and cyclohexane.

The invention is further illustrated by the following non-limitative examples:

EXAMPLE 1

956 grammes (7.43 mols) of orthochlorophenol are mixed with 100 gr. of copper powder which has previously been washed in chloroform. Whilst stirring, 478 gr. (3.46 mols) of potassium carbonate anhydride are added. Heating to 220° C. is carried out and a mixture of o-chlorophenol and distilled water is added. Slow-heating to around 350° C. is continued. By applying a low vacuum, the dibenzo-p-dioxine is distilled off. The vacuum is progressively increased until all the dibenzo-p-dioxine is distilled off. The product, after recrystallisation from benzene, has melting point of 119° C. The yield is 75%.

Tetranitro-dibenzo-p-dioxine is prepared by nitration of the dibenzo-p-dioxine using a mixture of concentrated nitric acid and concentrated sulphuric acid (H. Gilman and J. J. Dietrich, J. Amer. C. Soc. 80, 366 1558).

Tetra amino dibenzo-p-dioxine is obtained from 300 gr. of tetranitro-p-dioxine by reduction, using 9 litres of concentrated chlorohydric acid, 1.7 kg. of pure iron and, as a catalyst, a solution of 34 gr. of stannous chloride.

The tetra amino dibenzo-dioxine is liberated from the tetra-amino dibenzo-p-dioxine tetra chlorohydrate thus obtained using an ammoniacal solution, this until the solution has a pH value of 9. After centrifuging and washing in methanol, tetra amino dibenzo-p-dioxine is obtained. After recrystallisation in the mixture of dimethyl acetamide and methanol, the product is pure.

Into one of the compartments of a two-compartments flask, in a purified nitrogen atmosphere, 9.52 gr. of tetra amino dibenzo-p-dioxine are introduced, and there is then distilled in the other compartment of the flask one litre of dimethyl acetamide which has been preliminarily purified by distillation over $P_2O_5$ and pyromellitic anhydride (containing at the most 0.1 mg. of water per mm.), the dimethyl acetamide serving to dissolve all the reactive agents at low temperature. Part of the solvent is poured out over the tetra amino dibenzo-p-dioxine and into the ramaining solvent one mol of pyromellitic anhydride is introduced, this having been previously purified by sublimation. After dissolving the two reaction agents, the apparatus is cooled to $-10/-15°$ C. and the two solutions are mixed rapidly by agitating the flask. The temperature is allowed to rise to 20° C. after reaction has taken place and the reaction mixture is then concentrated by cooling the empty part of the two-compartment flask to $-8°$ C. until the prepolymer solution thus obtained has a "scraping" viscosity (15 poises).

The prepolymer solution is applied by a scraper to glass plates in a dust-free environment. In order to dry the film, the glass plate coated with the prepolymer solution is placed in an oven and heated in a pure nitrogen atmosphere in accordance with the following programme:

12 hours at 40° C.
1 hour and a half at 120° C.

In order to complete drying and to cyclize the polymer, heating is carried out in a nitrogen atmosphere containing oxygen:

½ hour at 150° C.
½ hour at 200° C.
½ hour at 250° C.
½ hour at 300° C.
½ hour at 370° C.

After slow cooling, the film can be detached from the glass plate by quenching it in water.

The film thus obtained is a very dark red. The following mechanical properties were measured using an "Instron" machine.

MECHANICAL PROPERTIES

| Test temperature, °C. | Film thickness (microns) | Breaking strength, F. kg./mm.³ | Percent elongation to rupture | Modulus of elasticity, kg./mm.³ |
|---|---|---|---|---|
| 25 | 22 | 12.5 | 3 | 440 |
| 330 | 27 | 6.3 | 3 | 295 |
| 408 | 28 | 7.7 | 4 | 238 |
| 452 | 28 | 4.3 | 2 | 229 |
| 504 | 22 | 4.5 | 1.5 | 325 |
| 527 | 21 | 2.5 | 1 | 400 |
| 562 | 29 | 0.5 | 0.5 | 350 |

The thermal stability of the film as obtained was determined by thermal analysis:

DYNAMIC THERMOGRAVIMETRY (3° C./MIN.)

| Temperature: | Weight loss, percent | |
|---|---|---|
| | In air | Under vacuum |
| 100 | 0 | 0 |
| 200 | 1 | 1 |
| 300 | 3 | 2 |
| 400 | 10 | 4 |
| 500 | 30 | 7 |
| 600 | 100 | 15 |
| 700 | | 32 |

ISOTHERMAL THERMOGRAVIMETRY

Weight loss of a film maintained at 450° C. under vacuum

| Time (hours): | Weight loss, percent |
|---|---|
| 0 | -- |
| 1 | 1 |
| 2 | 1 |
| 3 | 1 |
| 4 | 1.5 |
| 5 | 1.5 |
| 6 | 2 |
| 7 | 2 |
| 8 | 2 |

The polymer has no melting point and is insoluble in any known organic solvent.

EXAMPLE 2

A prepolymer film is manufactured in the manner set out in Example 1 and dried at 40° C. in a nitrogen atmosphere for 12 hours until the majority of the solvent has evaporated. Then it is dried for 2 hours at 110° C. in a nitrogen atmosphere.

The film is removed from the glass plate without water quenching and is drawn in one direction at 350° C. During this drawing operation, the film exhibits 16.5% elongation and the cycling of the polymer takes place quite rapidly. After drawing, the mechanical properties at 25° C., of this film, were as follows:

| | Kg./mm.² |
|---|---|
| Breaking strength | 21.8 |
| Modulus of elasticity | 750 |

We claim:

1. An aromatic-heterocyclic, thermally stable film-forming polymer consisting essentially of either one of the following structural formulae

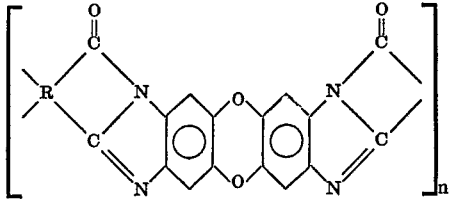

or

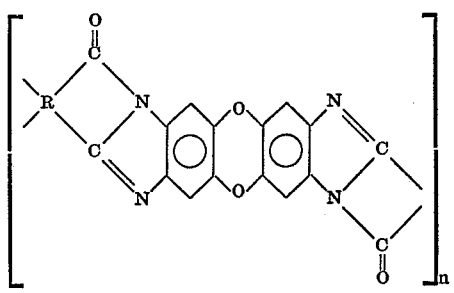

where $n$ is a sufficiently high whole number to enable good mechanical properties to be achieved, R is a tetravalent radical containing at least two carbon atoms and the two

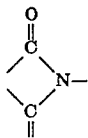

radicals are attached in the 1,2 or 1,3 position on the carbon atoms of the R-group when R is aliphatic, and at the ortho or peri positions when R is aromatic.

2. A process for producing an aromatic-heterocyclic ladder polymer having a high molecular weight main chain and containing therein a dibenzodioxine moiety as one of its constituents, comprising the steps of:
(a) reacting, in a solvent which is inert for the system, substantially equal molar quantities of tetra amino dibenzo-p-dioxine and a tetracarboxylic acid anhydride of the formula:

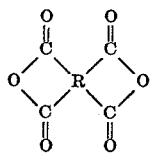

where R represents a tetravalent organic radical containing at least two carbon atoms connected to the four carbonyl groups, the carbonyl groups being connected in the 1,2 or 1,3 positions on the carbon atoms of the radical R if R is aliphatic, and in the ortho or peri positions if R is an aromatic radical;
(b) polymerising at a temperature of less than minus 10° C. in order to obtain a prepolymer;
(c) transforming the prepolymer into a final polymer by heating the prepolymer to a temperature of at least 150° C. to effect "cyclizing" dehydration.

3. A process as claimed in claim 2, in which, prior to transforming the prepolymer into the final polymer, the prepolymer is given the shape of the ultimate product.

4. A process as claimed in claim 2, in which, prior to transforming the prepolymer into the final product, it is applied in the form of a coating solution to a substrate.

5. A prepolymer produced by reacting at a temperature lower than about minus 10° C., in a solvent which is inert for the system, substantially equal molar quantities of tetra amino dibenzo-p-dioxine and a tetracarboxylic acid anhydride of the formula:

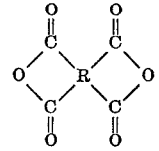

where R represents a tetravalent organic radical containing at least two carbon atoms, which is connected to the four carbonyl groups the carbonyl groups being connected in the 1,2 or 1,3 positions on the carbon atoms of the radical R if R is aliphatic, and in the ortho or peri positions if R is an aromatic radical.

References Cited
UNITED STATES PATENTS

| | | | |
|---|---|---|---|
| 3,414,543 | 12/1968 | Paufler | 260—47 |
| 3,549,594 | 12/1970 | Twilley et al. | 260—47 |
| 3,518,232 | 6/1970 | Bell | 260—78 |
| 3,567,684 | 3/1971 | Pruckmayr | 260—47 |
| 3,546,181 | 12/1970 | Arnold | 260—78 |
| 3,476,590 | 11/1969 | Rabilloud et al. | 117—126 |
| 3,435,004 | 3/1969 | Hathaway et al. | 260—65 |

WILLIAM H. SHORT, Primary Examiner

L. L. LEE, Assistant Examiner

U.S. Cl. X.R.

117—124 E, 132 B, 138.8 A, 161 UN; 161—197, 214, 227; 260—2.5 R, 30.2, 30.6 N, 30.8 R, 30.8 DS, 32.4, 32.6 N, 37 N, 65, 78 TF, 340.3